United States Patent
Hays (10) Patent No.: US 7,627,818 B2
(45) Date of Patent: Dec. 1, 2009

(54) DISPLAYING HTML TEXT ON A NON-GRAPHICAL CONSOLE

(75) Inventor: Douglas E. Hays, Nicholasville, KY (US)

(73) Assignee: International Business Machines Corporation, Armonk, NY (US)

(*) Notice: Subject to any disclaimer, the term of this patent is extended or adjusted under 35 U.S.C. 154(b) by 617 days.

(21) Appl. No.: 11/443,968

(22) Filed: May 31, 2006

(65) Prior Publication Data

US 2007/0283244 A1 Dec. 6, 2007

(51) Int. Cl.
G06F 17/20 (2006.01)
G06F 17/21 (2006.01)
G06F 17/22 (2006.01)
G06F 17/28 (2006.01)
G06F 17/30 (2006.01)

(52) U.S. Cl. .............. 715/269; 715/210; 715/255; 715/256; 707/1; 707/3; 707/6

(58) Field of Classification Search ............ 715/210, 715/255, 256, 269; 707/1, 3, 6
See application file for complete search history.

(56) References Cited

U.S. PATENT DOCUMENTS

| | | | |
|---|---|---|---|
| 6,073,148 A * | 6/2000 | Rowe et al. .............. 715/205 |
| 6,081,815 A | 6/2000 | Spitznagel et al. |
| 6,512,448 B1 * | 1/2003 | Rincon et al. ............ 340/7.51 |
| 6,552,728 B1 * | 4/2003 | Moore et al. ............. 715/234 |
| 6,662,224 B1 | 12/2003 | Angwin et al. |
| 6,675,358 B1 * | 1/2004 | Kido ........................ 715/264 |
| 6,694,484 B1 | 2/2004 | Mueller |
| 6,738,951 B1 | 5/2004 | Weiss et al. |
| 6,766,296 B1 * | 7/2004 | Adachi ..................... 704/246 |
| 6,993,752 B2 * | 1/2006 | Batthish ................... 717/137 |
| 7,464,101 B2 * | 12/2008 | Beitman .................... 707/6 |
| 2003/0197880 A1 | 10/2003 | Nakao |
| 2005/0027781 A1 | 2/2005 | Curry et al. |
| 2006/0025988 A1 * | 2/2006 | Xu et al. .................... 704/8 |

OTHER PUBLICATIONS

Borka Jerman-Blazic, Konstantin Chuguev, Andreij Gogala, "Standard specification extensions for provision of language and character enabled server", 1997, Computer Communications, pp. 927-936.*
Jay Nathan, Fuzzy Lookups and Groupings Provide Powerful Data Cleansing Capabilities, SQL Server 2005, Microsoft Corporation, pp. 1-6.*

* cited by examiner

Primary Examiner—Laurie Ries
Assistant Examiner—Chau Nguyen
(74) Attorney, Agent, or Firm—Joseph E. Bracken; Law Office of Jim Boice (57) ABSTRACT

Text from an HTML document is displayed without the use of a browser. The method includes receiving an HTML coded message that includes a text message that has been encoded using a sender's character set; identifying a character map pseudonym of a current character map of the receiving console; identifying the sender's character set that was used to encode the text message; identifying true character map names of character maps that are available to the receiving console; using the character map pseudonym to perform a first fuzzy search of the true character map names to identify a console character map; using the sender's character set to perform a second fuzzy search of the true character map names to identify a sender's character map that is associated with the sender's character set; and transencoding the text message from the sender's character map to the console character map.

20 Claims, 7 Drawing Sheets

DISPLAYING HTML TEXT ON A NON-GRAPHICAL CONSOLE

BACKGROUND OF THE INVENTION

The present invention relates in general to the field of computers and similar technologies, and in particular to software utilized in this field. Still more particularly, the present invention presents a method and system for displaying text content from an HTML document at a computer that lacks a browser.

Software products often provide on-line documentation and support to customers in HyperText Markup Language (HTML), so that items such as instruction manuals, installation instructions, help pages, etc. can be displayed using any common Web browser (e.g., Internet Explorer, Netscape, etc.). However, because of security issues, many, if not most, network managers deliberately do NOT install browsers on enterprise servers, since most viruses, hackers, and other mischief makers attack through browsers. Thus, while the absence of a browser improves system security, this prevents a user from reading needed support literature. Furthermore, there may be missing software or hardware prerequisites that prevent installation of a software product, and thus the product's ability to display the HTML text is likewise prevented.

Furthermore, there is the problem of encoding a text file into a user's displayable character map. That is, most "read me" files (that provide basic or advanced instructions for installing software and/or using a particular software feature) are often in plain text. As such, the text in the "read me" file will only be correctly displayed if the text is encoded using the correct character map of the receiving user's console. For example, assume that a text "read me" file is in Chinese using the character set for Big5, but the receiving user can only display Chinese characters using the UTF-8 character set. Using current technology, this "read me" file can be transencoded from Big5 to UTF-8 by transencoding software. However, since there is no way for the sender to know what character map every receiver will have, such transencoding is not feasible by the sender.

SUMMARY OF THE INVENTION

The present invention thus presents a computer-implementable method, system and computer medium for permitting a non-browser enabled computer to display a received HTML document. In one embodiment, the computer-implementable method includes receiving, at a receiving console that lacks software for displaying a HyperText Markup Language (HTML) coded message, an HTML coded message that includes a text message that has been encoded using a sender's character set; identifying a character map pseudonym of a current character map of the receiving console; identifying the sender's character set that was used to encode the text message; identifying true character map names of character maps that are available to the receiving console; using the character map pseudonym to perform a first fuzzy search of the true character map names of the character maps that are available to the receiving console, wherein the first fuzzy search identifies a console character map that is identified by the character map pseudonym; using the sender's character set to perform a second fuzzy search of the true character map names of the character maps that are available to the receiving console, wherein the second fuzzy search identifies a sender's character map that is associated with the sender's character set; and transencoding, if the sender's character map and the console character map are different, the text message from the sender's character map to the console character map.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

The present invention provides a method, system and computer-readable medium that permits a system that is non-enabled to read an HTML document (i.e., has no browser installed) to read the HTML document. The following pseudocode performs a preferred embodiment of the present invention. Particular areas and functions of the pseudocode are referenced by the identifiers "Sections A-H."

```
# Section "A"
# "Setup" code
    locale='$installsourcepath/GetLocale.sh'
    if[ –x "$BROWSER" ]; then
       (set –x
       $BROWSER $HTMLFILE) && exit
    fi
# SECTION "B"
# Identify the human readable form of the receiving console's current character map
    # use eval below to strip quotes and get a real charmap
    eval toCharmap='locale charmap'
```

```
    # strip off any filename extension that is sometimes added
    toCharmap='echo "$toCharmap" | sed "s:\..*::"'
    if[ -z "$toCharmap" ]; then
        toCharmap=$locale.iso88591
    fi
# SECTION "C"
# Identify the character set used by the text message
# Provide a default character set if needed
    # read the html file and look for the charset=
    fromCharset='grep -i "content[  ]*=.*charset=[   ]*[a-zA-Z\-\_0-9]*[   ]*[\'\"]" $HTMLFILE |
        sed "s:.*charset=[  ]*::; s:[       ]*[\'\"].*::"'
    # if not found, provide a default
    if [ -z "$fromCharset" ]; then
        fromCharset=iso88591
    fi
# SECTION "D"
# Find character maps that are available to the receiving console
    # get a list of all charmap names that this computer understands
    availableCharmaps='locale -a | egrep "^{locale}([\-\_][A-Z]*)?\." | sed "s:[\.]*\.::; s:@.*::" | sort -u | xargs -l99 echo'
# SECTION "E"
# Perform a fuzzy search of the maps identified in Sections B and C from the list returned # in Section D
    # get real charmap names for toCharmap and fromCharmap
      # normalize the toCharmap name
      toCharmapCompare='echo $toCharmap | tr "[A-Z]" "[a-z]" | sed "s:[[0-9a-z]::"'
      # normalize the fromCharmap name
      fromCharmapCompare='echo $fromCharset | tr "[A-Z]" "[a-z]" | sed "s:[0-9a-z]::"'
      for charmap in $availableCharmaps;do
          # normalize the charmap name to compare to
          charmapCompare='echo $charmap | tr "[A-Z]" "[a-z]" | sed "s:[0-9a-z]::"'
          if [ "$charmapCompare" = "$toCharmapCompare" ]; then
             # found a match so replace the fake name with the real name
             toCharmap=$charmap
          fi
          if [ "$charmapCompare" = "$fromCharmapCompare" ]; then
             # found a match so replace the fake name with the real name
             fromCharmap=$charmap
          fi
    done
# SECTION "F"
# See if it is necessary to convert the sender's character
# map(fromCharmap) to the receiver's character map(toCharmap)
    # check if conversion is needed
    if [ "$fromCharmap" = "$toCharmap" ]; then
        # no conversion needed
        PGM=cat
    else
        PGM="iconv -f $fromCharmap -t $toCharmap"
    fi
    cr='echo "\r\c"'
# SECTION "G"
# If necessary, run the Character Map conversion
# Perform text formatting for the file
# Strip off HTML tags
    # run the conversion (if needed) and perform post-processing to make it look nice
    OUTPUT_COMMAND="( ( set -x
                $PGM $HTMLFILE 2>/dev/null
                ) ||
                (
                   ( set -x
                        cat $installsourcepath/en/noBrowser.html
                   ) ||
                   echo ERROR: No supported browser could be found!
                )
                ) |
                sed \"s:<[Bb][Rr]>: :g; s:<[$$>]*>::g; s:\ \;: :g; s:\<\;:<:g; s:\>\;:>:g;
s:$$[  ][     ]*:\" | uniq | $PAGER"
# SECTION H
# Send cleaned-up file to console display
    if [ -z "$PAGER" ]; then
         if [ -t 1 ]; then
             pager="cat"
         elif [ "$DISPLAY" ]; then
             pager="cat && read nothing"
         else
             pager="cat"
         fi
```

-continued

```
    PAGER='( IFS=:
    for path in $PATH;do
        if [ -x "$path/more" ]; then
            pager="$path/more"
            break
        elif [ -x "$path/less" ]; then
            pager="$path/less"
            break
        elif [ -x "$path/pg" ]; then
            pager="$path/pg"
            break
        fi
    done
    echo $pager )'
fi
if [ -t 1 ]; then
    # if stdout is going to the console, just send the output there
    eval "$OUTPUT_COMMAND"
elif [ "$DISPLAY" ]; then
    # try to display in an xterm
    PATH=$PATH:/usr/bin:/usr/X11R6/bin:/usr/bin/X11:/usr/lpp/X11/bin:/usr/openwin/bin
    xterm -e /bin/sh -c "$OUTPUT_COMMAND" || eval "$OUTPUT_COMMAND"
else
    # just send the output somewhere and see what happens
    eval "$OUTPUT_COMMAND"
fi
```

Figure 1:
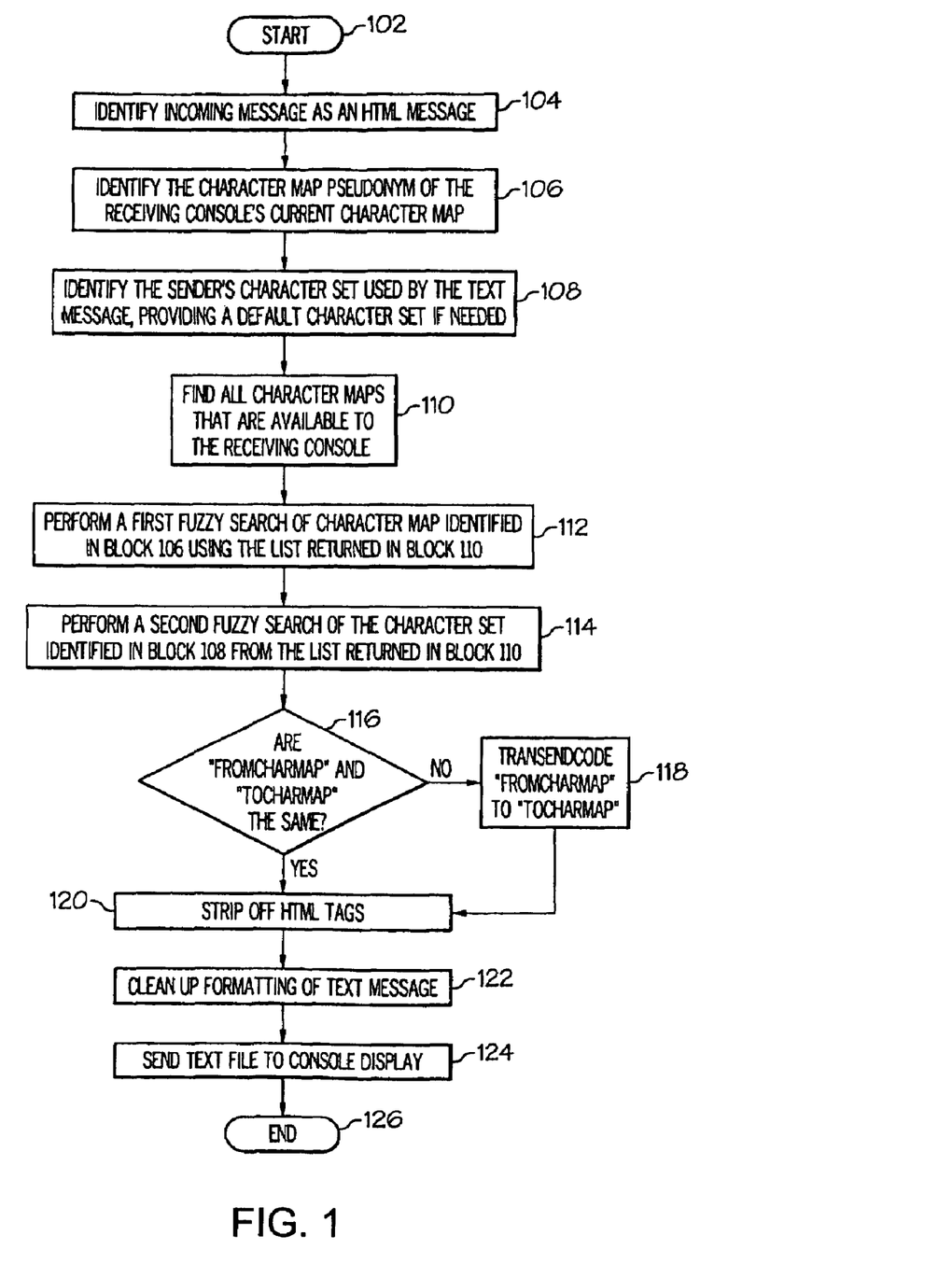
FIG. 1 is a flow-chart of exemplary steps taken to display a text file from an HTML message on a system that is not HTML-enabled.

With reference now to the figures, and in particular to FIG. 1, a flow-chart of exemplary steps, which are described in greater detail herein and in reference to the above-listed pseudocode, is presented. After initiator block 102, a receiving console identifies an incoming message as being coded in HyperText Markup Language (HTML), as indicated by block 104. Note that the receiving console does not have software (e.g., a browser) that permits it to interpret and display an HTML document. Note also that, as shown in Section "A" of the pseudocode, the "locale" (geographical region) of the receiving console is identified, which aids in determining which spoken/written dialect is likely used by a user of the receiving console.

As described in block 106 (and Section "B" of the pseudocode), the human-readable form of the receiving console's current character map is identified. For example, the text string "iso88591", which is the standard character set for the Latin alphabet, may be returned, but this is NOT the actual name of a character map as understood by the receiving console. The returned human-readable character maps may or may not be limited to those using a human language that is specific for the receiving console.

As described in block 108 (and portions of the code shown in Section "C" of the pseudocode), the sender's character set used by the HTML document is identified. This "Charset" value is either obtained from the HTML tag, or else a default character set (e.g., 8-bit Unicode Transformation Format UTF-8) is assumed to be the character set used by the HTML document.

As shown in block 110 (and Section "D" of the pseudocode), all character maps ("toCharmap" candidates) that are available to the receiving console are found. Thereafter, as shown in block 112 (and Section "E" of the pseudocode), a first fuzzy search of the character maps identified at block 106 and 110 is performed to identify a "real" name of a "toCharmap". This first fuzzy search uses the "fake" human-readable name of the receiving console's character map and identifies which "real" name (of a receiving console's character map) best fits the "fake" human-readable name. For example, assume that first fuzzy search algorithm uses the local console's default character map (e.g., "2312") and the locale/language ("zh_TW"—Traditional Chinese) as input parameters to return "zh_TW.gb2312" as the actual character map name for the "toCharmap".

As shown in block 114 (and Section "E" of the pseudocode), a second fuzzy search of the character maps identified in block 110 is performed using the character set identified in block 108 as an input. For example, assume that the sender determines, based on an examination of the receiving console's setting, that the receiving console is set up to receive inputs that are in traditional Chinese using the Big5 character set. The inputs to a second fuzzy logic algorithm will thus be "zh_TW" (the language environment variable for traditional Chinese) and UTF-8 (the HTML Charset used by the HTML document). The second fuzzy logic algorithm searches through all of the receiving console's character maps, and may return a "real" Charmap of "zh_TW.utf8", which supports traditional ("TW") Chinese ("zh") characters in UTF-8 format. This defines the "fromCharmap".

Note that, in the description above, a character map is defined as an index of keyboard characters that can be inputted into the receiving console. A character set is defined as the index of displayable characters that can be inputted into a text message of an HTML document. Note that the character set may span/encompass multiple languages, while a character map is defined for a single language/dialect.

In the example cited above, the local "toCharmap" can only display GB2312 characters on the local receiving console. To resolve the problem of characters that are not understood by the GB2312 encoding, a transencoding process (e.g., the "iconv" utility) is run, if necessary. That is, if the "fromCharmap" and the "toCharmap" are the same character maps (block 116 and Section "F" of the pseudocode), then no conversion is necessary. However, if the "fromCharmap" and the "toCharmap" are different (as in the example presented above), then "fromCharmap" used by the text message in the HTML document must be converted to the "toCharmap" of the receiving console (as described in block 118 and Section "G" of the pseudocode). Thus, the step transencodes the text message from the sender's character map to the console character map. That is, transencoding is defined as converting character encodings from one character map into a corresponding character encoding in another character map. Thus, the letter "A" is "A" in both character maps, but each character map uses a different encoding array index.

As described in block 120 and Section "G" of the pseudocode, any HTML tags are then stripped off the incoming HTML document. As is understood by those knowledgeable of HTML, an HTML document typically includes content (e.g., a text message) that is sandwiched between a leading start HTML tag and a trailing end HTML tag (plus additional tags that are interspersed with the content). Note that in one embodiment of the present invention, information from the HTML tag(s) that describes which character set was used by the HTML document may be saved in another file for future reference. Thereafter, the text content is "prettied up" (fonts, line returns, margins, etc. are reformatted), as described in block 122 and Section "G" of the pseudocode, and the text content is displayed on the local console (block 124 and Section "H" of the pseudocode). If necessary, a console display (and driver) can be created/supplied for displaying the text content, if such a display (and driver) do not already exist. The process ends in the flow-chart at terminator block 126.

Figure 2:
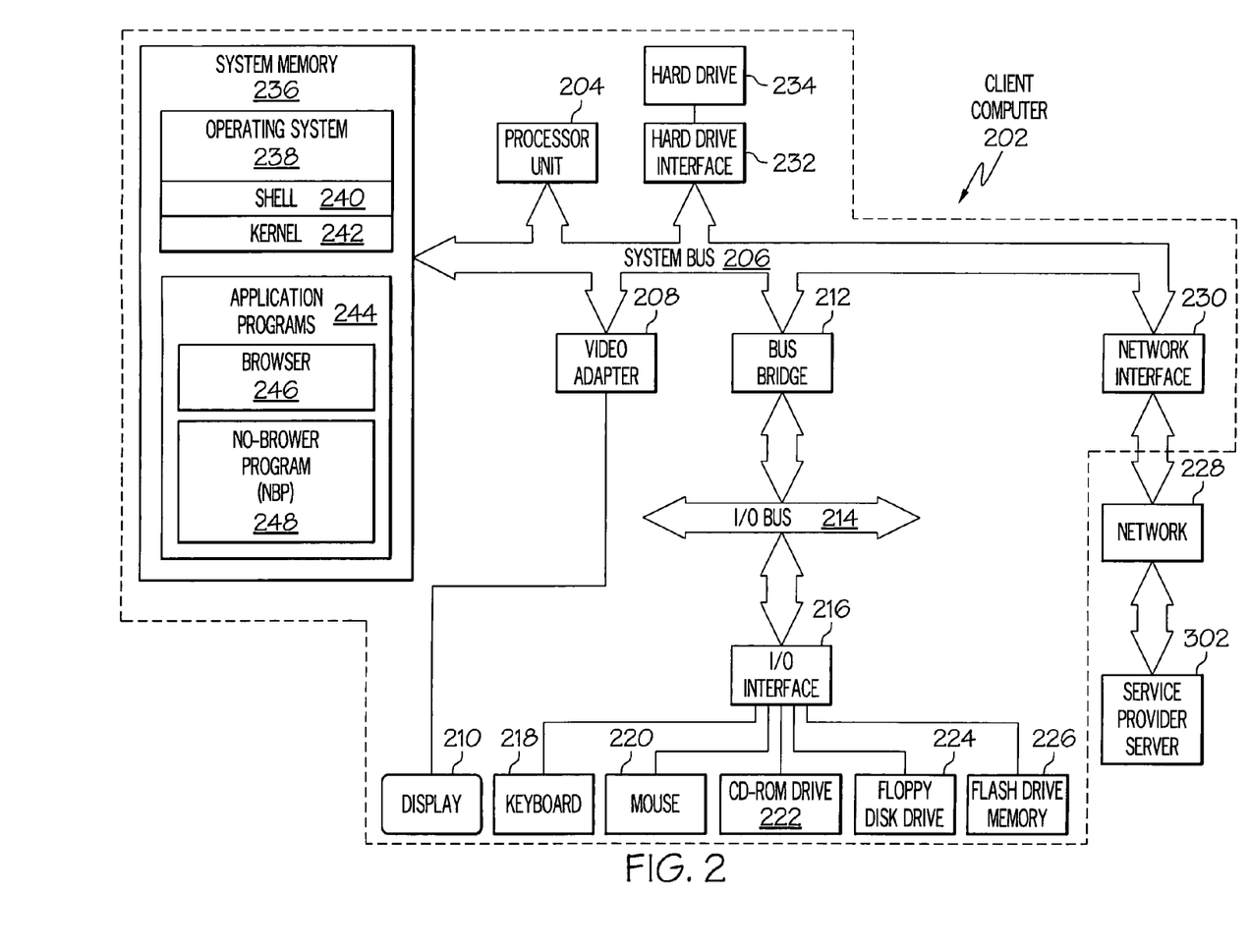
FIG. 2 depicts an exemplary client computer in which the present invention may implemented.

With reference now to FIG. 2, there is depicted a block diagram of an exemplary client computer 202, in which the present invention may be utilized. Client computer 202 includes a processor unit 204 that is coupled to a system bus 206. A video adapter 208, which drives/supports a display 210, is also coupled to system bus 206. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Figure 3:
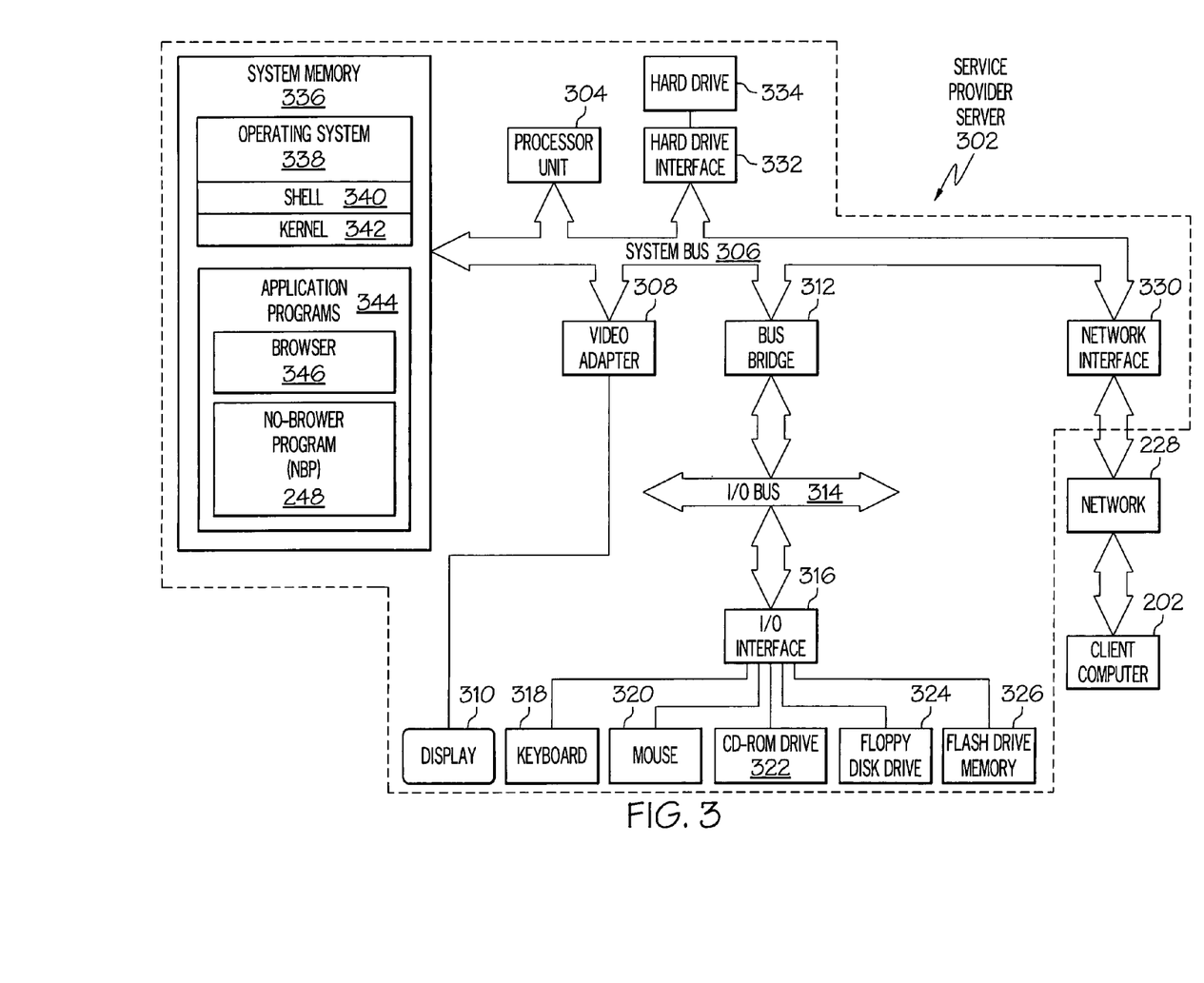
FIG. 3 illustrates an exemplary server from which software for executing the present invention may be deployed and/or implemented for the benefit of a user of the client computer shown in FIG. 2.

Client computer 202 is able to communicate with a service provider server 302 via a network 228 using a network interface 230, which is coupled to system bus 206. Network 228 may be an external network such as the Internet, or an internal network such as an Ethernet or a Virtual Private Network (VPN). Using network 228, client computer 202 is able to use the present invention to access service provider server 302.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes client computer 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc.

As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a browser 246. Browser 246 includes program modules and instructions enabling a World Wide Web (WWW) client (i.e., client computer 202) to send and receive network messages to the Internet using HyperText Transfer Protocol (HTTP) messaging, thus enabling communication with service provider server 302.

Application programs 244 in client computer 202's system memory also include a No-Browser Program (NBP) 248, which includes code for implementing the processes described in FIG. 1, and including, but is not limited to, those computer instructions described above in the presented pseudocode. In one embodiment, client computer 202 is able to download NBP 248 from service provider server 302.

The hardware elements depicted in client computer 202 are not intended to be exhaustive, but rather are representative to highlight essential components required by the present invention. For instance, client computer 202 may include alternate memory storage devices such as magnetic cassettes, Digital Versatile Disks (DVDs), Bernoulli cartridges, and the like. These and other variations are intended to be within the spirit and scope of the present invention.

As noted above, NBP 248 can be downloaded to client computer 202 from service provider server 302, shown in exemplary form in FIG. 3. Service provider server 302 includes a processor unit 304 that is coupled to a system bus 306. A video adapter 308 is also coupled to system bus 306. Video adapter 308 drives/supports a display 310. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Service provider server 302 is able to communicate with client computer 202 via network 228 using a network interface 330, which is coupled to system bus 306. Access to network 228 allows service provider server 302 to execute and/or download NBP 248 to client computer 202.

System bus 306 is also coupled to a hard drive interface 332, which interfaces with a hard drive 334. In a preferred embodiment, hard drive 334 populates a system memory 336, which is also coupled to system bus 306. Data that populates system memory 336 includes service provider server 302's operating system 338, which includes a shell 340 and a kernel 342. Shell 340 is incorporated in a higher level operating system layer and utilized for providing transparent user access to resources such as application programs 344, which include a browser 346, and a copy of NBP 348 described above, which can be deployed to client computer 202.

The hardware elements depicted in service provider server 302 are not intended to be exhaustive, but rather are representative to highlight essential components required by the present invention. For instance, service provider server 302 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 302 performs all of the functions associated with the present invention (including execution of NBP 248), thus freeing client computer 202 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of NBP 248, are performed by service provider server 302. Alternatively, NBP 248 and the method described herein, and in particular as shown and described in FIG. 1, can be deployed as a process software from service provider server 302 to client computer 202. Still more particularly, process software for the method so described may be deployed to service provider server 302 by another service provider server (not shown).

Figure 4A:
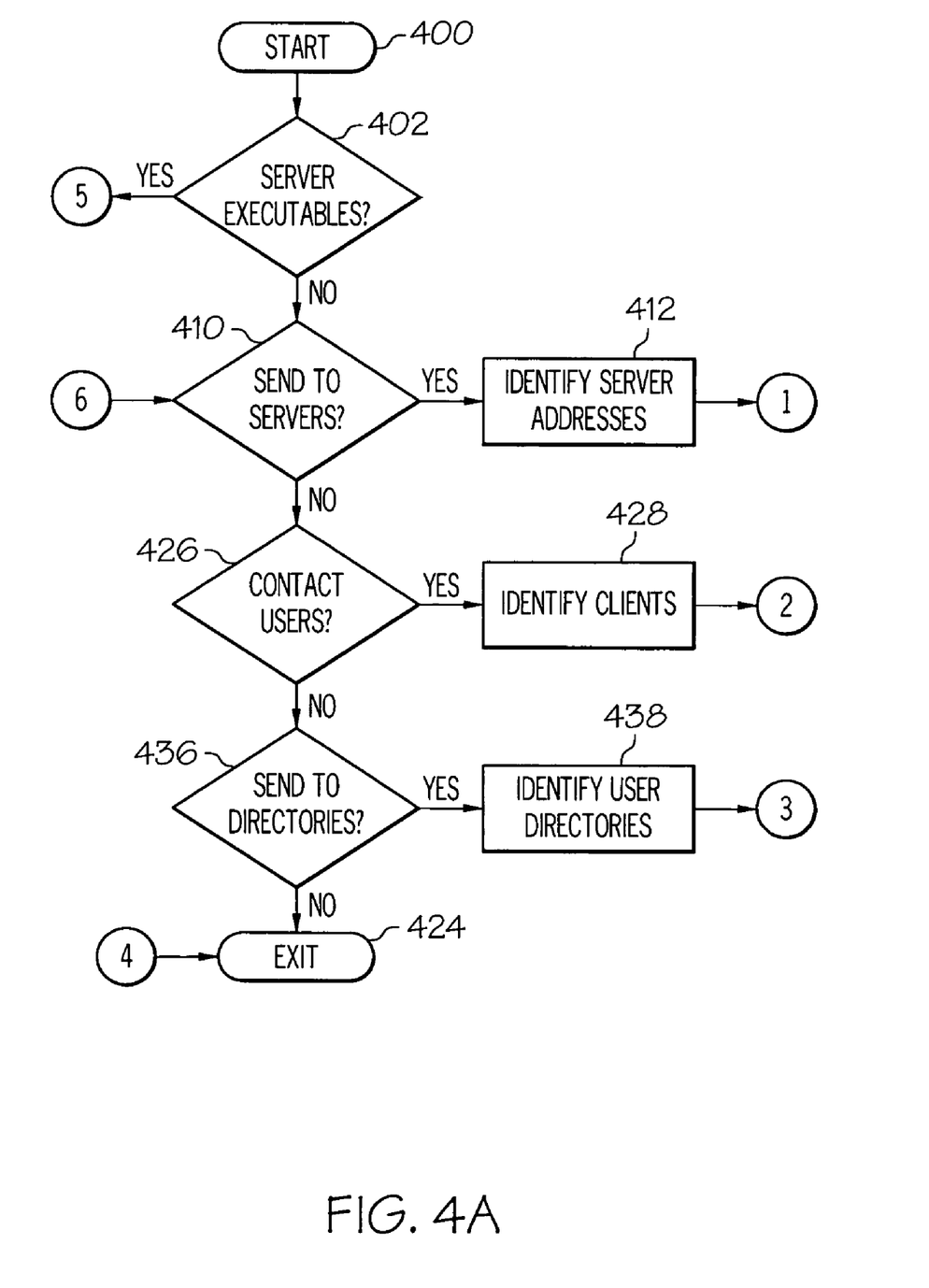
FIGS. 4a-b show a flow-chart of steps taken to deploy software capable of executing the steps shown and described in FIG. 1.
Figure 4B:
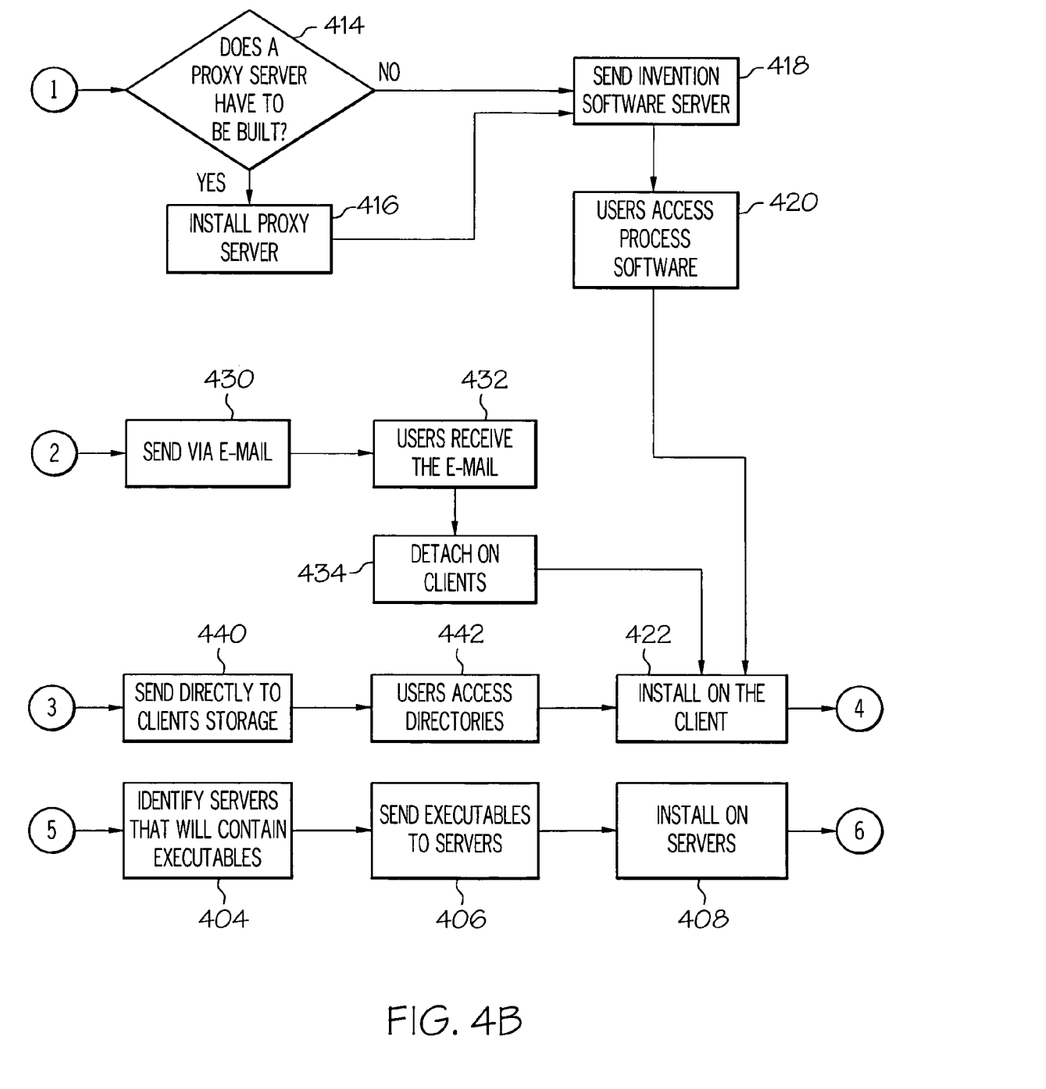

Referring then to FIGS. 4a-b, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made as to whether the process software will be sent directly to user directories on their client computers (query block 436). If so, the user directories are identified (block 438). The process software is transferred directly to the user's client computer directory (block 440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 5A:
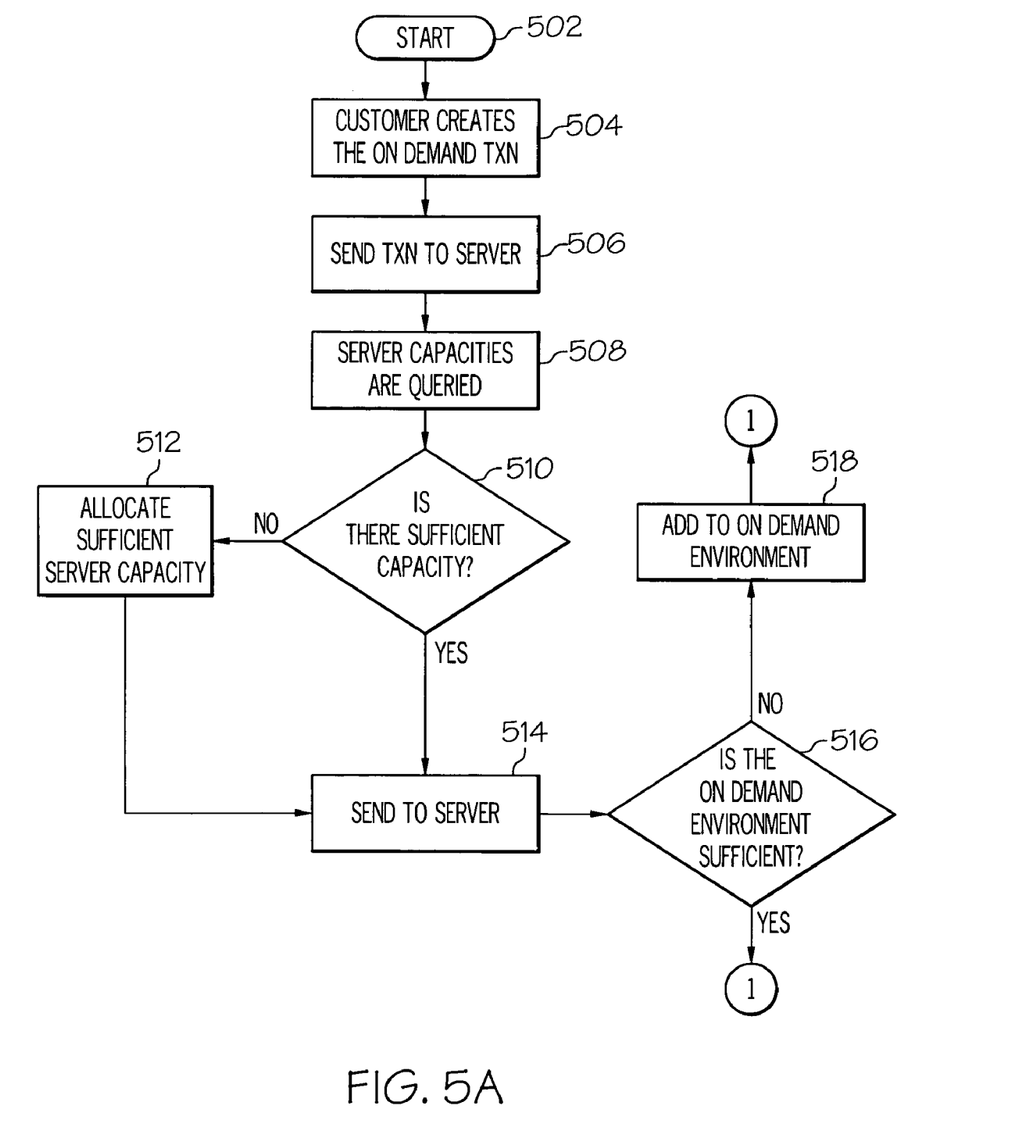
FIGS. 5a-b show a flow-chart showing steps taken to execute the steps shown and described in FIG. 1 using an on-demand service provider.
Figure 5B:
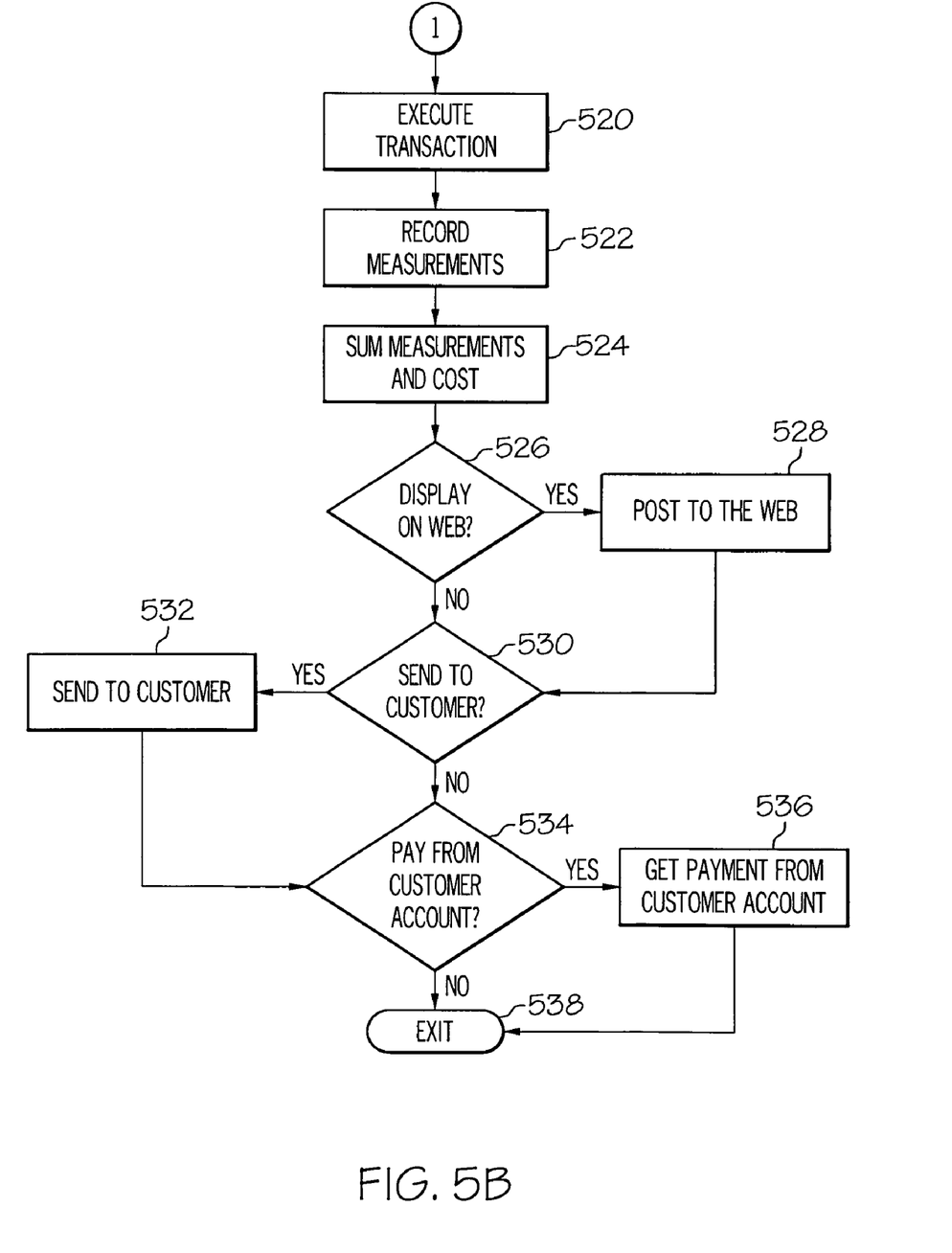

With reference now to FIGS. 5a-b, initiator block 502 begins the On Demand process. A transaction is created than contains the unique customer identification, the requested service type and any service parameters that further, specify the type of service (block 504). The transaction is then sent to the main server (block 506). In an On Demand environment the main server can initially be the only server, then as capacity is consumed other servers are added to the On Demand environment.

The server central processing unit (CPU) capacities in the On Demand environment are queried (block 508). The CPU requirement of the transaction is estimated, then the servers available CPU capacity in the On Demand environment are compared to the transaction CPU requirement to see if there is sufficient CPU available capacity in any server to process the transaction (query block 510). If there is not sufficient server CPU available capacity, then additional server CPU capacity is allocated to process the transaction (block 512). If there was already sufficient Available CPU capacity then the transaction is sent to a selected server (block 514).

Before executing the transaction, a check is made of the remaining On Demand environment to determine if the environment has sufficient available capacity for processing the transaction. This environment capacity consists of such things as but not limited to network bandwidth, processor memory, storage etc. (block 516). If there is not sufficient available capacity, then capacity will be added to the On Demand environment (block 518). Next the required software to process the transaction is accessed, loaded into memory, then the transaction is executed (block 520).

The usage measurements are recorded (block 522). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 524).

If the customer has requested that the On Demand costs be posted to a web site (query block 526), then they are posted (block 528). If the customer has requested that the On Demand costs be sent via e-mail to a customer address (query block 530), then these costs are sent to the customer (block 532). If the customer has requested that the On Demand costs be paid directly from a customer account (query block 534), then payment is received directly from the customer account (block 536). The On Demand process is then exited at terminator block 538.

The present invention thus presents a computer-implementable method, system and computer medium for permitting a non-browser enabled computer to display a received HTML document. In one embodiment, the computer implementable method includes receiving, at a receiving console that lacks software for displaying a HyperText Markup Language (HTML) coded message, an HTML coded message that includes a text message that has been encoded using a sender's character set; identifying a character map pseudonym of a current character map of the receiving console; identifying the sender's character set that was used to encode the text message; identifying true character map names of character maps that are available to the receiving console; using the character map pseudonym to perform a first fuzzy search of the true character map names of the character maps that are available to the receiving console, wherein the first fuzzy search identifies a console character map that is identified by the character map pseudonym; using the sender's character set to perform a second fuzzy search of the true character map names of the character maps that are available to the receiving console, wherein the second fuzzy search identifies a sender's character map that is associated with the sender's character set; and transencoding, if the sender's character map and the console character map are different, the text message from the sender's character map to the console character map. It is understood that in one embodiment, the term "fuzzy search" is used to describe a process of searching for a character map that shares some, if not all, attributes of another character map. These attributes include, but are not limited to, the name features of the character maps. The first fuzzy search may further include the step of alphanumerically matching similar but unequal true character map names, which are supported by the receiving console, to the character map pseudonym. The second fuzzy search may further include the step of alphanumerically matching similar but unequal true character map names, which are supported by the receiving console, to a sender's character set that has been constrained by a locale of the receiving console. In one embodiment, the method may include the further step of stripping off any HTML tags in the HTML coded message after transencoding the text message, wherein the transencoding is performed only if the sender's character map and the console character map are different. The text message may ultimately be reformatted for display on a console display. If a console display does not already exist, then it may be created, along with a display driver for operability. Note further that, as described above, instructions used in each embodiment of a computer-usable medium may be deployed from a service provider to a user. Note also that the "true character map names" referenced above are the actual map names for the character maps, which actual map names can be directly located (and/or pointed to). The concept of a character map being "identified" is understood to relate to the concept of a character map pseudonym name being "associated with" (in order to identify) a truly named character map. This deployment may be made in an "on-demand" basis as described herein.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
receiving, at a receiving console that lacks software for displaying a HyperText Markup Language (HTML) coded message, an HTML coded message that includes a text message that has been encoded using a sender's character set;
identifying a character map pseudonym of a current character map of the receiving console;
identifying the sender's character set that was used to encode the text message;
identifying true character map names of character maps that are available to the receiving console;
using the character map pseudonym to perform a first fuzzy search of the true character map names of the character maps that are available to the receiving console, wherein the first fuzzy search identifies a console character map that is identified by the character map pseudonym;
using the sender's character set to perform a second fuzzy search of the true character map names of the character maps that are available to the receiving console, wherein the second fuzzy search identifies a sender's character map that is associated with the sender's character set; and
transencoding, if the sender's character map and the console character map are different, the text message from the sender's character map to the console character map.

2. The computer-implementable method of claim 1, wherein the first fuzzy search further comprises:
alphanumerically matching similar but unequal true character map names, which are supported by the receiving console, to the character map pseudonym.

3. The computer-implementable method of claim 1, wherein the second fuzzy search further comprises:
alphanumerically matching similar but unequal true character map names, which are supported by the receiving console, to a sender's character set that has been constrained by a locale of the receiving console.

4. The computer-implementable method of claim 1, further comprising:
stripping off any HTML tags in the HTML coded message after transencoding the text message, wherein the transencoding is performed only if the sender's character map and the console character map are different.

5. The computer-implementable method of claim 1, further comprising:
reformatting the text message for display.

6. The computer-implementable method of claim 5, further comprising:
creating a console display; and
displaying the text message on the console display.

7. A system comprising:
a processor;
a data bus coupled to the processor;
a memory coupled to the data bus; and
a computer-usable medium embodying computer program code, the computer program code comprising instructions executable by the processor and configured for:
receiving, at a receiving console that lacks software for displaying a HyperText Markup Language (HTML) coded message, an HTML coded message that includes a text message that has been encoded using a sender's character set;
identifying a character map pseudonym of a current character map of the receiving console;
identifying the sender's character set that was used to encode the text message;
identifying true character map names of character maps that are available to the receiving console;
using the character map pseudonym to perform a first fuzzy search of the true character map names of the character maps that are available to the receiving console, wherein the first fuzzy search identifies a console character map that is identified by the character map pseudonym;
using the sender's character set to perform a second fuzzy search of the true character map names of the character maps that are available to the receiving console, wherein the second fuzzy search identifies a sender's character map that is associated with the sender's character set; and
transencoding, if the sender's character map and the console character map are different, the text message from the sender's character map to the console character map.

8. The system of claim 7, wherein the instructions that are configured for the first fuzzy search are further configured for:
alphanumerically matching similar but unequal true character map names, which are supported by the receiving console, to the character map pseudonym.

9. The system of claim 7, wherein the instructions that are configured for the second fuzzy search are further configured for:
alphanumerically matching similar but unequal true character map names, which are supported by the receiving console, to a sender's character set that has been constrained by a locale of the receiving console.

10. The system of claim 7, wherein the instructions are further configured for:
stripping off any HTML tags in the HTML coded message after transencoding the text message, wherein the transencoding is performed only if the sender's character map and the console character map are different.

11. The system of claim 7, wherein the instructions are further configured for:
reformatting the text message for display.

12. The system of claim 11, wherein the instructions are further configured for:
displaying the text message on a console display.

13. A computer storage medium embodying computer program code, the computer program code comprising computer executable instructions configured for:
receiving, at a receiving console that lacks software for displaying a HyperText Markup Language (HTML) coded message, an HTML coded message that includes a text message that has been encoded using a sender's character set;
identifying a character map pseudonym of a current character map of the receiving console;
identifying the sender's character set that was used to encode the text message;
identifying true character map names of character maps that are available to the receiving console;
using the character map pseudonym to perform a first fuzzy search of the true character map names of the character maps that are available to the receiving console, wherein the first fuzzy search identifies a console character map that is identified by the character map pseudonym;
using the sender's character set to perform a second fuzzy search of the true character map names of the character maps that are available to the receiving console, wherein the second fuzzy search identifies a sender's character map that is associated with the sender's character set; and
transencoding, if the sender's character map and the console character map are different, the text message from the sender's character map to the console character map.

14. The computer storage medium of claim 13, wherein the computer executable instructions that are configured for the first fuzzy search are further configured for:
alphanumerically matching similar but unequal true character map names, which are supported by the receiving console, to the character map pseudonym.

15. The computer storage medium of claim 13, wherein the computer executable instructions that are configured for the second fuzzy search are further configured for:
alphanumerically matching similar but unequal true character map names, which are supported by the receiving console, to a sender's character set that has been constrained by a locale of the receiving console.

16. The computer storage medium of claim 13, wherein the computer executable instructions are further configured for:
stripping off any HTML tags in the HTML coded message after transencoding the text message, wherein the transencoding is performed only if the sender's character map and the console character map are different.

17. The computer storage medium of claim 13, wherein the computer executable instructions are further configured for:
reformatting the text message for display.

18. The computer storage medium of claim 17, wherein the computer executable instructions are further configured for:
creating a console display driver; and
displaying the text message on a console display.

19. The computer storage medium of claim 13, wherein the computer executable instructions are deployable to a client computer from a server at a remote location.

20. The computer storage medium of claim 13, wherein the computer executable instructions are provided by a service provider to a customer on an on-demand basis.

* * * * *

UNITED STATES PATENT AND TRADEMARK OFFICE
CERTIFICATE OF CORRECTION

PATENT NO. : 7,627,818 B2
APPLICATION NO. : 11/443968
DATED : December 1, 2009
INVENTOR(S) : Douglas E. Hays It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Second Day of November, 2010

David J. Kappos
*Director of the United States Patent and Trademark Office*